H. STANDISH.
GRAIN-SEPARATORS.

No. 195,053. Patented Sept. 11, 1877.

ATTEST.
O. F. Adix
William M. Poggin

INVENTOR
Hiram Standish
By G. L. Chopin, Atty.

2 Sheets—Sheet 2.

H. STANDISH.
GRAIN-SEPARATORS.

No. 195,053. Patented Sept. 11, 1877.

ATTEST:
O. H. Adix
William M. Goggin

INVENTOR:
Hiram Standish
By G. L. Chapin,
Atty

N. PETERS, PHOTO-LITHOGRAPHER, WASHINGTON, D. C.

UNITED STATES PATENT OFFICE.

HIRAM STANDISH, OF JOY, ILLINOIS.

IMPROVEMENT IN GRAIN-SEPARATORS.

Specification forming part of Letters Patent No. 195,053, dated September 11, 1877; application filed May 18, 1877.

*To all whom it may concern:*

Be it known that I, HIRAM STANDISH, of Joy, in the county of Mercer and State of Illinois, have invented a new and useful Improvement in Seed-Separators, of which the following is a specification:

The present invention consists in novel means for taking the grain from the vibrating riddles and delivering it evenly to two rotating screens.

Figure 1:
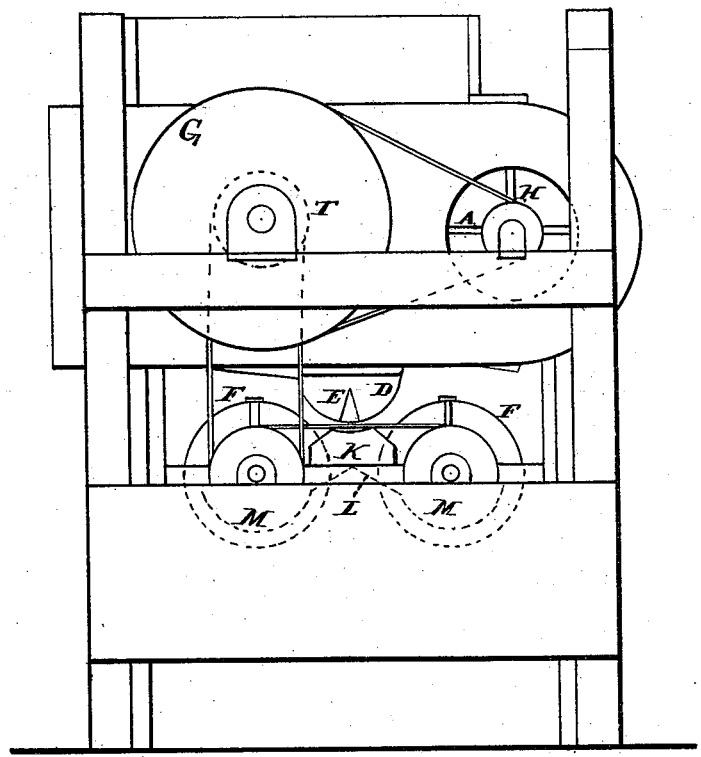
Figure 2:
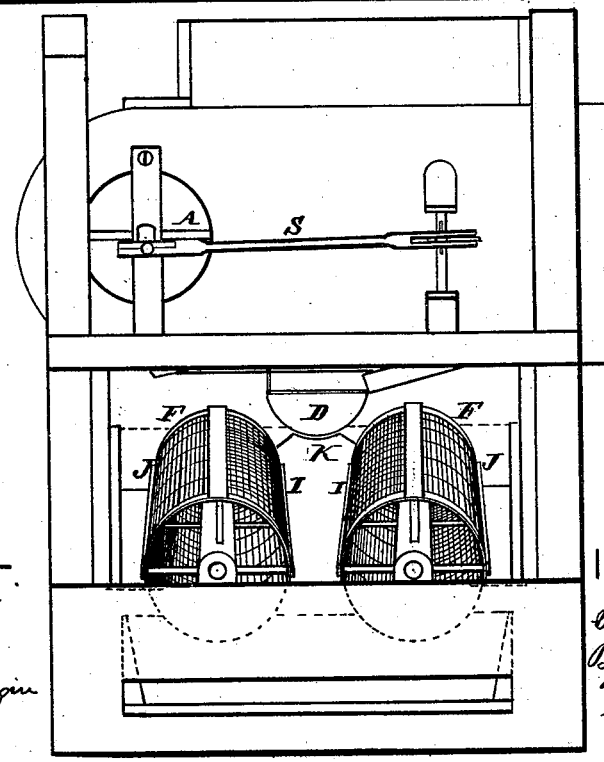
Figure 3:
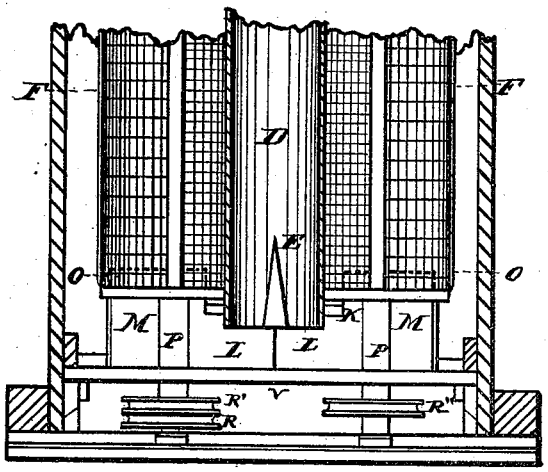
Figure 4:
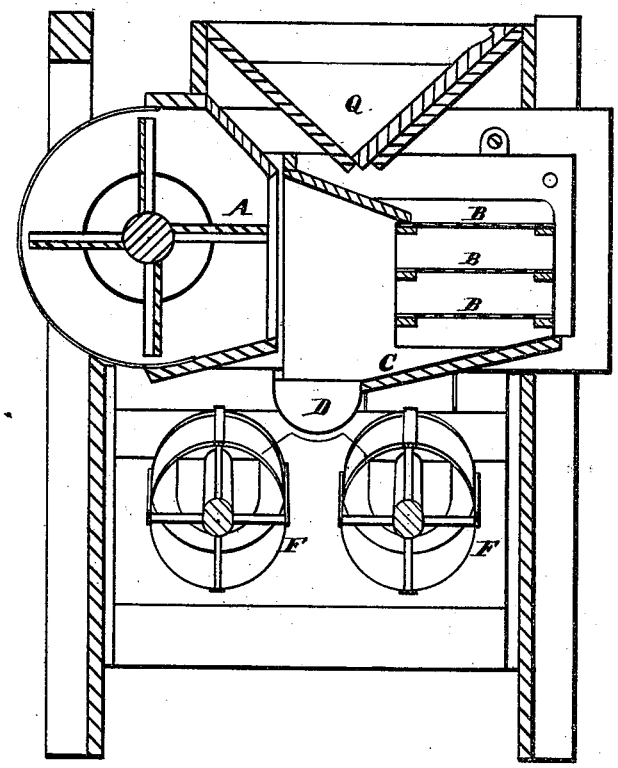

In the drawings, Figure 1 is an end elevation of a seed-separator embodying my invention, a door being open to show more clearly the construction. Fig. 2 is an elevation of the opposite end of the separator from that shown at Fig. 1, a door at this end also being open to show the screens. Fig. 3, Sheet 2, is a horizontal section of a part of the separator. Fig. 4 is a central transverse section of the separator.

A represents a blast-fan driven by a belt from drive-pulley G, running on a pulley, H, on the shaft of fan. A small pulley, T, dotted lines, Fig. 1, carries a belt passing over pulley R, Fig. 3; and a belt running over pulley R', Fig. 3, and over pulley R'' drives the shafts of the rotating screens.

S, Fig. 2, indicates the means for actuating the riddle shaker.

All of the parts have the ordinary construction of seed-separators, except as hereinafter described.

The means for conducting the seed in even quantities from the riddles B, Fig. 4, to the respective screens F, consists of a chute-board, C, semi-cylindrical trough D, double-inclined chutes L, Figs. 1 and 3, troughs M M, and divider E.

The trough D is made semi-cylindrical in cross-section, that the greatest depth of seed may be centrally therein, and moved with the least friction to a wedge-shaped divider, E, placed in the delivery end of the trough to conduct the seed in equal parts, respectively, to the screens by means of the inclines L and troughs M. The trough D, being attached to the shoe, has a vibratory movement with it, and consequently facilitates the proper movement of grain in the trough as fast as it comes from the riddles, whereby the rotating screens are evenly fed, so as to work to their fullest capacity.

The operation is similar, in so far as attention is concerned, to other seed-separators; the seed being put in the hopper and the fan put in motion, which, by the aforementioned belts and pulleys, imparts a proper motion to the riddles, screens, shoe, and trough D, the separated seeds being spouted off in the usual manner.

I claim and desire to secure by Letters Patent—

The semi-cylindrical trough D, attached to the shoe so as to have a vibratory movement, and provided with a wedge-shaped divider, E, for delivering seed in equal quantities to the screens F, respectively, as and for the purpose set forth.

HIRAM STANDISH.

Witnesses:
 W. B. ARTZ,
 J. H. CRANE.